June 25, 1957  P. H. GREENLEE ET AL  2,797,407
INDICATOR LIGHT
Filed Dec. 6, 1955
FIG.1.
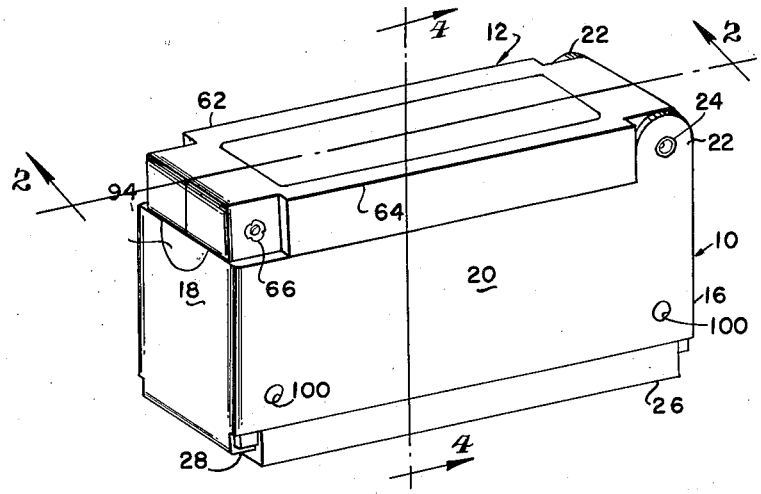
FIG.2.
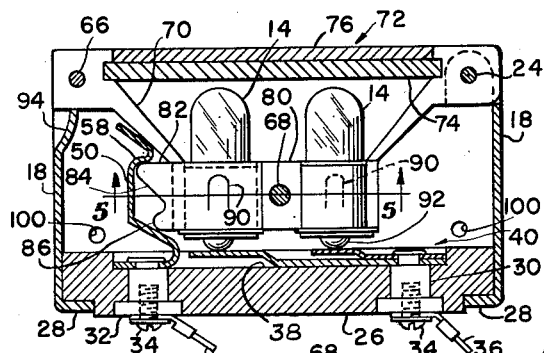
FIG.3.
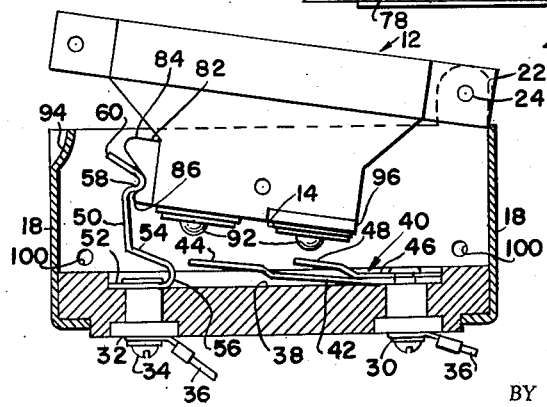
FIG.4.
FIG.5.
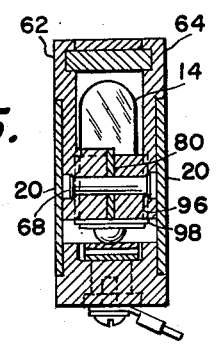
INVENTORS
PAUL H. GREENLEE
ROBERT S. RINKINEN
BY Cushman, Darby & Cushman
ATTORNEYS United States Patent Office 2,797,407
Patented June 25, 1957

2,797,407

INDICATOR LIGHT

Paul H. Greenlee and Robert S. Rinkinen, Urbana, Ohio, assignors to Grimes Manufacturing Company, Urbana, Ohio, a corporation of Ohio Application December 6, 1955, Serial No. 551,328

11 Claims. (Cl. 340—366)

The present invention relates to an improved indicator or signal light unit designed to operate as a single unit or in a bank of two or more units to warn and otherwise provide information to the pilots or crew of aircraft.

An object of the present invention is to provide an indicator assembly in which the unit can be held in one position to enable a visible signal to be displayed by means of an electric lamp and after the signal has been displayed, the unit can be moved to another position to thereby deenergize the lamp.

Ancillary to the preceding object, it is an object of the present invention to provide an indicator assembly which can be held locked in one position to enable a visible signal to be displayed by means of an electric lamp and after the signal has been displayed, the unit can be moved to a second position to deenergize the lamp and by its movement to the second position will give a second visual indication that a certain condition exists, for example, that a fault has occurred and remains to be corrected.

Still another object of the present invention is to provide an arrangement of indicator assemblies employed in a bank of two or more, each unit being locked in a first position to give an electrical signal and each unit being movable to a second position to thereby deenergize the electrical signal when it occurs, the movement to the second position being such that one looking at the bank of indicators can immediately ascertain where a particular fault or condition has occurred.

Another object of the present invention is to provide an indicator assembly which is simple in design, easy to manufacture and low in cost.

A still further object of the present invention is to provide an indicator assembly wherein the unit may be held in a deenergized position, and when in this position, will visually indicate that a certain condition or fault has occurred, for example, that it is necessary to make repairs to the component associated with the particular indicator assembly.

These and other objects and advantages of the invention will be more apparent from the following specification, claims, and drawings in which Figure 1 is a perspective view of the indicator assembly unit of the present invention;

Figure 2 is a vertical sectional view taken on the line 2—2 of Figure 1 and showing the cover of the indicator assembly locked in a position where the lamps may be energized;

Figure 3 is a vertical sectional view partly in elevation and similar to Figure 2 but showing the cover of the indicator assembly unit in a position where the lamps are deenergized and locked in a second position;

Figure 4 is a vertical sectional view taken on the line 4—4 of Figure 1; and

Figure 5 is a fragmentary sectional view taken on the line 5—5 of Figure 2, the lamps being omitted from the lamp sockets for the purpose of clarity.

Referring to the drawings wherein like characters or reference numerals represent like or similar parts, and, more particularly, to Figures 1 and 2, the indicator assembly of the present invention includes a housing generally indicated by the numeral 10, a cover generally indicated by the numeral 12, and a plurality of lamps 14 mounted in the cover and retained within the housing. Housing 10 includes a metal shell 16 having end walls 18 and side walls 20. Extending upwardly from each of the side walls 20 adjacent one of its end walls are ears 22, having apertures therein for receiving the trunnion ends of a pivot pin 24. The pivot pin 24 may be a rivet or the like and extends through suitable apertures in the end of cover 12 so that cover 12 may be pivoted with respect to housing 10.

Housing 10 is provided with a bottom wall 26 made of a non-conducting plastic material. Bottom wall 26 is supported in shell 16 by means of ears 28 on end walls 18, the ears being crimped around the non-conducting bottom wall as best shown in Figure 2. Electrical terminals 30 and 32 are supported and extend through the bottom wall 26. Each terminal 36 is provided with a screw for attaching leads 36 from a component to which the indicator assembly is to be associated. The inner surface of bottom wall 26 is provided with a recess 38 into which the terminals 30 and 32 extend.

Terminal 30 is provided with a current conducting member 40 which includes a flat strip of resilient metal 42 having an offset portion 44 and a second flat strip of resilient metal 46 having an offset portion 48. Attached to the other terminal 32 is a resilient keeper member 50 made of a strip of current conducting material. Keeper member 50 has a base 52 suitably attached to terminal 32 and then has an upwardly curved portion at one edge as shown at 56, the strip of metal of the keeper member being partially returned upon itself and then bent upwardly and inclined outwardly as shown at 54. The inclined portion 54, which may be bent intermediate its ends, is provided with an inwardly extending latch engaging portion 58 which is reversely bent and terminates at 60. A more detailed description of the purpose of keeper member 50 and its latch engaging portion 58 will follow later in the specification.

Referring now to Figures 2, 4 and 5, cover 12, which is hingedly connected to housing 10, is formed of two complementary sections 62 and 64 which are made of a plastic non-conducting material. The two sections 62 and 64 are so shaped that when they are secured together by rivets 66 and 68, they define a frusto-conical recess 70 having its smaller end extending into the shell 16 of housing 10. The larger end of recess 70 supports a light-transmitting member 72 which may comprise a lower translucent or transparent element 74 carrying suitable indicia, such as the name of the operating component to which it is connected, and an upper translucent element 76 which may be red so as to filter light emitted from lamps 14. The portion of cover member 12 which extends downwardly into the shell of housing 10 is provided with circular openings or bores 78 which extend into recess 70. Bores or sockets 78 are adapted to receive and support the cylindrical base of each of the lamps 14.

Interposed between the two sections 62 and 64 of cover 12 at its lower end portion is a current conducting member 80. As best shown in Figure 5, current conducting member 80 is an S-shaped strip of metal having its two semi-circular portions received in the bores 78 so that it will engage the contacts on the cylindrical bases of lamps 14. A portion 82 of current conducting member 80 extends outwardly of the cover member and serves to cooperate with keeper 50 as a latch for latching cover 12 in a first or second position. Rivet 68 which, as previously mentioned, holds the sections 62 and 64 together also retains the current conducting member in position between the sections as it passes through the member. As shown in Figure 2, latch 82 is provided with an upper ear or projection 84 which cooperates with the latch engaging portion 58 of keeper 50 to hold the cover in the closed position and the lamps 14 in a position where they may be energized upon a condition occurring in the component to which the indicator assembly is connected. A second ear or projection 86 is provided beneath projection 84 and is adapted to cooperate with latch engaging portion 58 of keeper 50 when the cover 12 is in the position shown in Figure 3 and the lamps are then in a position where they cannot be energized.

The semi-circular portions of current conducting member 80 carried in the bores 78 are each provided with a spring finger 90 which extends inwardly toward the center of the bore. Spring fingers 90 serve to detachably retain lamps 14 in cover 12 and also provide electrical contacts between the base contacts of the lamps and the current conducting means 80. Lamps 14 are provided with the usual center contacts 92 which are adapted to engage the end portions 44 and 48 of current conducting member 40 as best shown in Figure 2.

In order that the cover 12 may be easily opened from the position shown in Figure 2 to the position shown in Figure 3, the end wall 18 of housing 10 which is furthest away from the point where cover 12 is hinged to the housing, is provided with an indentation 94 at its upper end, the indentation providing a fingertip grip whereby the end of cover 12 may be grasped. To permit easy removal and replacement of the lamps 14, the end portion of cover 12 adjacent the base of lamps 14 is undercut or beveled, as shown at 96 in Figures 3 and 4. The bevel portion 96 permits grasping of the flange 98 of the base of lamp 14 by the fingertips.

As hereinbefore mentioned, the indicator assembly of the present invention may be supported on an instrument panel or the like of an aircraft either as a single unit or in a bank of units with the side walls adjacent one another. To provide easy mounting on an instrument panel or any other suitable support, holes 100 are drilled through the housing so that the housing may be attached to suitable brackets or aligned and supported by other suitable means with other similar housings.

The operation of the present invention may be described briefly as follows: The indicator assembly is mounted as a single unit or as a bank of units on the instrument panel, for example, in aircraft. The terminals 30 and 32 of the indicator assembly are connected by suitable wiring or leads 36 to the component with which the indicator is to be associated. In other words, if the indicator assembly is to give a warning of low oil pressure in a particular engine of a multi-engine aircraft, the terminals 32 and 30 will be connected to a suitable switch which is operable by the oil pressure of the engine. The switch will normally be opened and, thus, current will not flow through and light the lamps 14.

Under normal operations, the indicator assembly has its cover in the position shown in Figure 2 and, thus, the contacts 92 on lamps 14 are in engagement with the current conducting member 40. When a fault occurs in the oil system, such as a drop in oil pressure, the oil pressure responsive switch closes and the circuit to lamps 14 energized by current flowing through the current conducting means 40 to the contacts 92 and from there through the current conducting means 80, keeper 50, terminal 32 to ground or the like. Of course, the current could flow in the reverse direction depending on which terminal is connected to ground. The light emitted by lamps 14 warns the pilot that a fault has occurred and a corrective action must be taken, for example, feathering the propeller and cutting off the engine or the like.

Since the warning light continues to operate so long as the fault occurs in the component to which the indicator assembly is connected, it may become very disturbing to the pilot. To turn the light off, the pilot merely moves the cover from the position shown in Figure 2 to the position shown in Figure 3 where the terminals 92 of lamps 14 become disengaged with the current conducting means 40, thus, breaking the circuit to the lamps 14. By having the cover extend outwardly of the housing when in the position shown in Figure 3, the pilot or the crew will have a visual indication that trouble has occurred in the component to which the indicator assembly is connected. In other words, the physical position of the cover with respect to the housing will be a constant indication or reminder that a condition in the component to which the indicator assembly is connected still remains to be corrected.

Although the indicator assembly has been described in connection with the oil system of an aircraft, it is of course within the scope of the invention that the indicator assembly could be used with other components of aircraft to indicate a particular condition or give a warning of malfunction. The indicator assembly could be used, for example, to determine whether a generator is working, the landing gear down and locked or in the restricted position, a decrease in manifold pressure in the engine, a fire in a nacelle, or the like.

In the present embodiment of the invention as disclosed in the drawings, the indicator assembly is provided with two lamps 14 which are in a parallel circuit. By having lamps in a parallel circuit, should one lamp fail, there is always a second lamp which would light and indicate to a pilot that a certain condition has occurred. However, it is of course within the scope of the invention that instead of a plurality of lamps mounted in parallel, a single lamp could be utilized.

The terminology used in the specification is for the purpose of description and not limitation, the scope of the invention being defined in the claims.

We claim:

1. An indicator assembly comprising a housing having an indicator lamp therein, said lamp having electrical contacts thereon, electrical terminals carried by said housing and adapted to be connected to a source of energy, means for movably mounting said lamp in said housing from a first position to a second position, current conducting means connected to one of said terminals and adapted to engage one of the contacts on said lamp when said mounting means is in said first position, a second current conducting means engaging the other of said contacts on said lamp, said second current conducting means including a latch supported on said movable mounting means, keeper means connected to the other of said terminals, said keeper means cooperating with said latch to hold said lamp in engagement with said first conducting means when said movable mounting means is in said first position and to positively hold said lamp out of engagement with said first conducting means when said movable mounting means is in said second position.

2. An indicator assembly of the character described in claim 1 wherein said movable mounting means includes a cover movably connected to said housing, said cover supporting said lamp within said housing and having a light-transmitting element therein through which light from said lamp can be transmitted when said movable mounting means is in said first position.

3. An indicator assembly of the character described in claim 2 wherein said cover when moved to said second position is outwardly of said housing.

4. In an indicator assembly adapted to be supported on an instrument panel or the like, a housing having at least one non-conducting wall, electrical terminals carired by the non-conducting wall of said housig and adapted to be connected to a source of energy, a cover hingedly connected to said housing and having a portion thereof extending within said housing, said cover being provided with a light-transmitting element and an internal recess, a lamp having at least a pair of electrical contacts thereon, means for detachably supporting said lamp in said recess, said detachable supporting means including a current conducting element carried by said cover and engaging one of the contacts of said lamp, said current conducting element including a latch, a resilient current conducting keeper element connected to one of said terminals, said keeper element cooperating with the latch of said current conducting element to hold said cover in a first position and a second position, current conducting means connected to the other of said terminals, said current conducting means being in engagement with the other of said contacts on said lamp when said cover is in said first position and being out of engagement with the other of said contacts on said lamp when said cover is in said second position.

5. An indicator assembly of the character described in claim 4 wherein said cover is outwardly of said housing and of the instrument panel toward an observer when in said second position.

6. An indicator assembly of the character described in claim 4 wherein said housing is provided with an indented portion in the edge of one of its walls adjacent said cover, said indented portion providing a fingertip grip whereby said cover can be moved from one of said positions to the other of said positions.

7. In an indicator assembly adapted to be supported in an instrument panel, a housing having a pair of terminals thereon adapted to be connected to a source of electrical energy, a cover pivotally connected to said housing and capable of movement from a closed position to a full open position, means to positively retain said cover in the closed position and in a position intermediate of the closed position and the full open position, said cover having a light-transmitting element therein and an interior recess beneath said light-transmitting element, a plurality of lamps each having electrical contacts thereon, means to support said plurality of lamps in the recess of said cover behind said light-transmitting element, said last mentioned means being current conducting and including an S-shaped strip for engaging one of said contacts on each of said lamps, current conducting means adapted to engage the other of said electrical contacts on each of said lamps and connect said lamps in parallel when said cover is in said closed position, the other of said contacts of each of said lamps being out of engagement with said current conducting means when said cover is moved to at least said intermediate position.

8. An indicator assembly of the character described in claim 7 wherein said current conducting means includes a pair of resilient electrical spring contacts connected to one of the said terminals, each resilient spring contact of said pair of contacts adapted to engage the other of said contacts of each of said lamps when said cover is in said closed position.

9. An indicator assembly of the character described in claim 7 wherein said cover is positioned outwardly of said housing and the instrument panel toward an observer when said cover is in said intermediate position and the lamps are out of engagement with said current conducting means.

10. In an indicator assembly adapted to be supported on an instrument panel or the like, a housing, an electrical contact in said housing, a cover pivotally connected to said housing and capable of movement from a closed position on said housing to a full open position, an indicator lamp carried by said cover and adapted to engage said electrical contact when said cover is in the closed position, latch and keeper means to positively retain said cover in the closed position and in a position intermediate of the closed position and the full open position where said lamp is held out of engagement with said contact, said latch and keeper means also providing an electrical contact for said indicator lamp.

11. In an indicator assembly adapted to be supported on an instrument panel or the like, a housing, a cover pivotally connected to said housing and capable of movement from a closed position on said housing to a full open position, said cover having a light transmitting element therein, a plurality of lamps supported in said cover behind said light transmitting element, current conducting means connecting said lamps in parallel when said cover is in said closed position, and latch and keeper means to positively retain said cover in the closed position and in a position intermediate the closed position and the full open position where said lamps are positively held out of engagement with said current conducting means, said cover when held in said intermediate position by said latch and keeper means is positioned outwardly of said housing and of the instrument panel toward an observer.

References Cited in the file of this patent

UNITED STATES PATENTS

| | | |
|---|---|---|
| 1,512,071 | Whittington | Oct. 21, 1924 |
| 1,871,650 | Bartley | Aug. 16, 1932 |
| 1,982,501 | Douglas | Nov. 27, 1934 |
| 2,002,251 | Sensiba, et al. | May 21, 1935 |

FOREIGN PATENTS

| | | |
|---|---|---|
| 600,572 | Great Britain | Apr. 13, 1948 |